(12) United States Patent
Tatton

(10) Patent No.: US 9,988,920 B2
(45) Date of Patent: Jun. 5, 2018

(54) FAN BLADE PLATFORM SEAL WITH LEADING EDGE WINGLET

(71) Applicant: UNITED TECHNOLOGIES CORPORATION, Farmington, CT (US)

(72) Inventor: Royce Tatton, Blackfoot, ID (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 385 days.

(21) Appl. No.: 14/681,557

(22) Filed: Apr. 8, 2015

(65) Prior Publication Data

US 2016/0298479 A1    Oct. 13, 2016

(51) Int. Cl.
*F01D 11/00* (2006.01)
*F01D 5/30* (2006.01)
*F02K 3/06* (2006.01)

(52) U.S. Cl.
CPC .......... *F01D 11/008* (2013.01); *F01D 5/3023* (2013.01); *F02K 3/06* (2013.01); *F05D 2220/36* (2013.01); *F05D 2300/431* (2013.01); *F05D 2300/437* (2013.01)

(58) Field of Classification Search
CPC .... F01D 11/005; F01D 11/006; F01D 11/008; F01D 5/3023; F01D 5/303; F01D 5/3038; F01D 5/3046
See application file for complete search history.

(56) References Cited

U.S. PATENT DOCUMENTS

| | | | |
|---|---|---|---|
| 4,183,720 A | 1/1980 | Brantley | |
| 4,326,835 A | 4/1982 | Wertz | |
| 4,422,827 A * | 12/1983 | Buxe | F01D 11/001 415/173.7 |
| 4,580,946 A | 4/1986 | Bobo | |
| 5,820,338 A | 10/1998 | Kasprow et al. | |
| 6,520,742 B1 | 2/2003 | Forrester | |
| 2009/0269202 A1 | 10/2009 | Borzakian et al. | |
| 2012/0244003 A1* | 9/2012 | Mason | F01D 11/008 416/219 R |

(Continued)

FOREIGN PATENT DOCUMENTS

| | | | | |
|---|---|---|---|---|
| CA | 2682867 A1 * | 4/2011 | | F01D 9/04 |
| EP | 2312186 A1 | 4/2011 | | |

(Continued)

OTHER PUBLICATIONS

European Search Report for Application No. EP 16 16 4429.
JP3684620 English Abstract.
JP3684620 English Machine Translation of Description and Claims.

*Primary Examiner* — Richard Edgar
*Assistant Examiner* — John S Hunter
(74) *Attorney, Agent, or Firm* — Cantor Colburn LLP (57) ABSTRACT

A fan section for a gas turbine engine is provided. The fan section having a fan hub with a slot and a fan blade with an airfoil extending from a root to a tip, the airfoil having a leading edge and the root is received in the slot, wherein a first platform is secured to the fan hub and arranged between adjacent fan blades of the fan section, the first platform having a first platform seal including a platform seal leading edge and a base is secured to a side of the first platform and a first winglet extends from the platform seal leading edge and contacts the airfoil leading edge.

12 Claims, 6 Drawing Sheets

(56) References Cited

U.S. PATENT DOCUMENTS

2014/0169979 A1 6/2014 Alarcon et al.
2014/0286781 A1 9/2014 Billings et al.
2015/0016960 A1 1/2015 Ravier

FOREIGN PATENT DOCUMENTS

JP 3684620 B2 8/2005
WO 2014149260 9/2014

\* cited by examiner

FAN BLADE PLATFORM SEAL WITH LEADING EDGE WINGLET

TECHNICAL FIELD OF THE DISCLOSED EMBODIMENTS

The present disclosures relate generally to a gas turbine engine and, more particularly, to a fan blade platform platform seal with a leading edge winglet.

BACKGROUND OF THE DISCLOSED EMBODIMENTS

Generally, flap style fan blade platform seals have shown a weakness in sealing performance near the blade root leading edge. The platform seals by nature deflect significantly from their as-produced position when installed in the engine. Sealing near the blade leading edge has been problematic. Additionally, the seals are difficult to produce since the seals are fabric reinforced for durability and strength. Current manufacturing methods cannot produce seals with adequate fabric coverage for certain geometries. This results in non-conforming hardware, difficulty bonding the seals to the platforms, and premature seal wear. Moreover, near the leading edge, the fan blade geometry undercuts the fan platform. This geometry is not conducive to a seal which is subject to centrifugal loads. The flap on the seal tends to pull away from the blade surface when exposed to centrifugal loads.

SUMMARY OF THE DISCLOSED EMBODIMENTS

In one aspect, a fan section for a gas turbine engine is provided. The fan section includes a fan hub including a slot and a fan blade including an airfoil extending from a root to a tip. The airfoil has an airfoil leading edge and the root is received in the slot. A first platform is secured to the fan hub and arranged between adjacent fan blades. A first platform seal including a platform seal leading edge and a base is secured to a side of the first platform. A first winglet extends from the platform seal leading edge and contacts the airfoil leading edge.

In a further embodiment of the above, the fan section further includes a spinner including a castellated spinner seal. The first winglet contacts the castellated spinner seal.

In a further embodiment of any of the above, the fan section further includes a second platform and a second platform seal secured to the second platform. The second platform seal has a second winglet that contacts the first winglet.

In a further embodiment of any of the above, the first winglet is formed from a stiff material constructed and arranged to stiffen the first platform seal against deflections.

In a further embodiment of any of the above, the first platform seal is constructed from an elastomeric material.

In a further embodiment of any of the above, the elastomeric material is a silicone rubber.

In a further embodiment of any of the above, the first winglet is constructed from an elastomeric material.

In a further embodiment of any of the above, the elastomeric material is a silicone rubber.

In one aspect, a gas turbine is provided including a fan section. The fan section includes a fan hub having a slot and a fan blade including an airfoil extending from a root to a tip. The airfoil has an airfoil leading edge and the root is received in the slot. A first platform is secured to the fan hub and arranged between adjacent fan blades. A first platform seal including a platform seal leading edge and a base is secured to a side of the first platform. A first winglet extends from the platform seal leading edge and contacts the airfoil leading edge.

In a further embodiment of the above, the gas turbine engine further includes a spinner including a castellated spinner seal. The first winglet contacts the castellated spinner seal.

In a further embodiment of any of the above, the gas turbine engine further includes a second platform and a second platform seal secured to the second platform. The second platform seal has a second winglet that contacts the first winglet.

In a further embodiment of any of the above, the first winglet is formed from a stiff material to stiffen the platform seal against deflections.

In a further embodiment of any of the above, the first platform seal is constructed from an elastomeric material.

In a further embodiment of any of the above, the elastomeric material is a silicone rubber.

In a further embodiment of any of the above, the first winglet is constructed from an elastomeric material.

In a further embodiment of any of the above, the elastomeric material is a silicone rubber.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
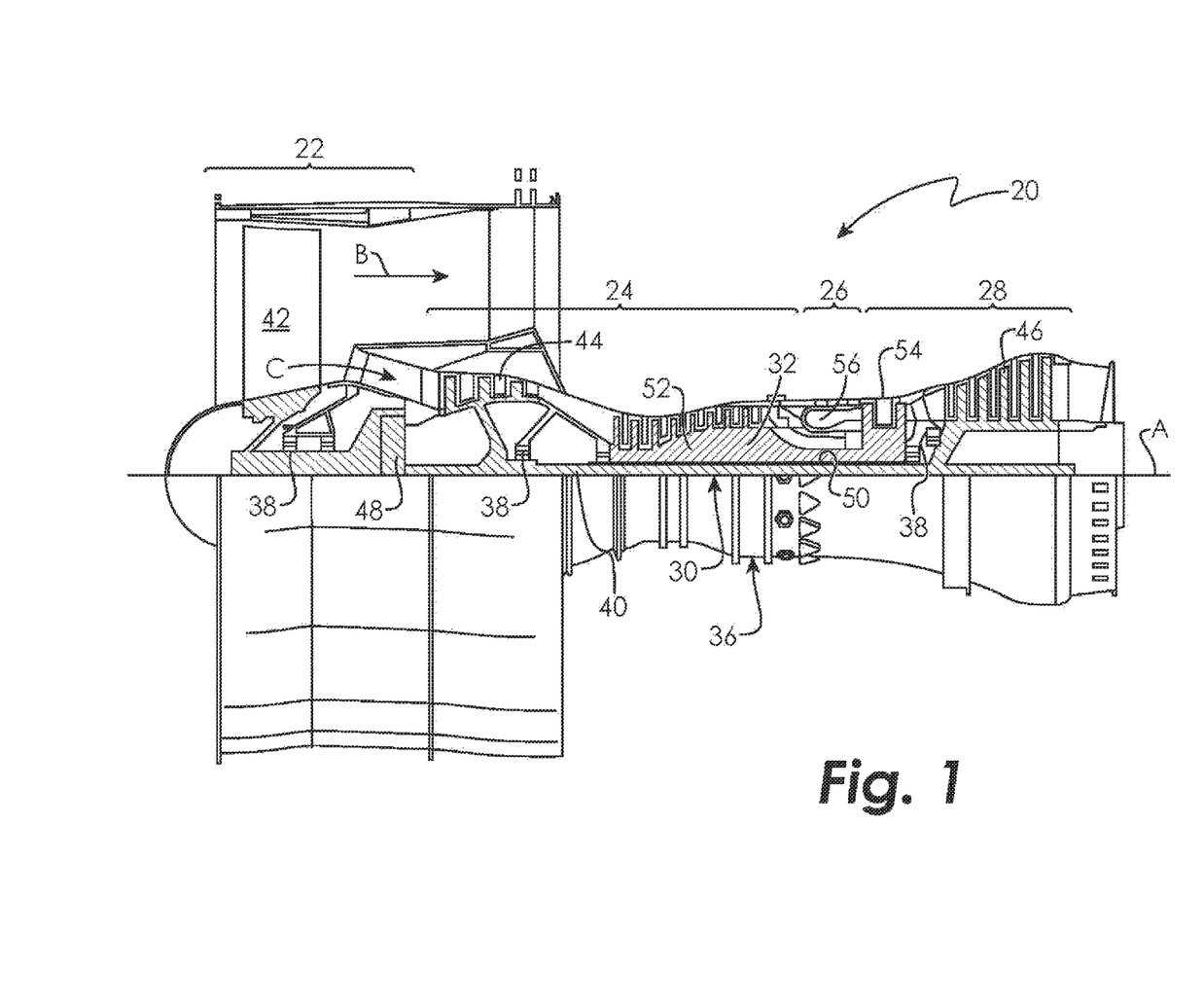
FIG. 1 is a sectional view of a gas turbine engine in an embodiment.

FIG. 1 shows a gas turbine engine 20, such as a gas turbine used for power generation or propulsion, circumferentially disposed about an engine centerline, or axial centerline axis A. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 m/sec).

Figure 2:
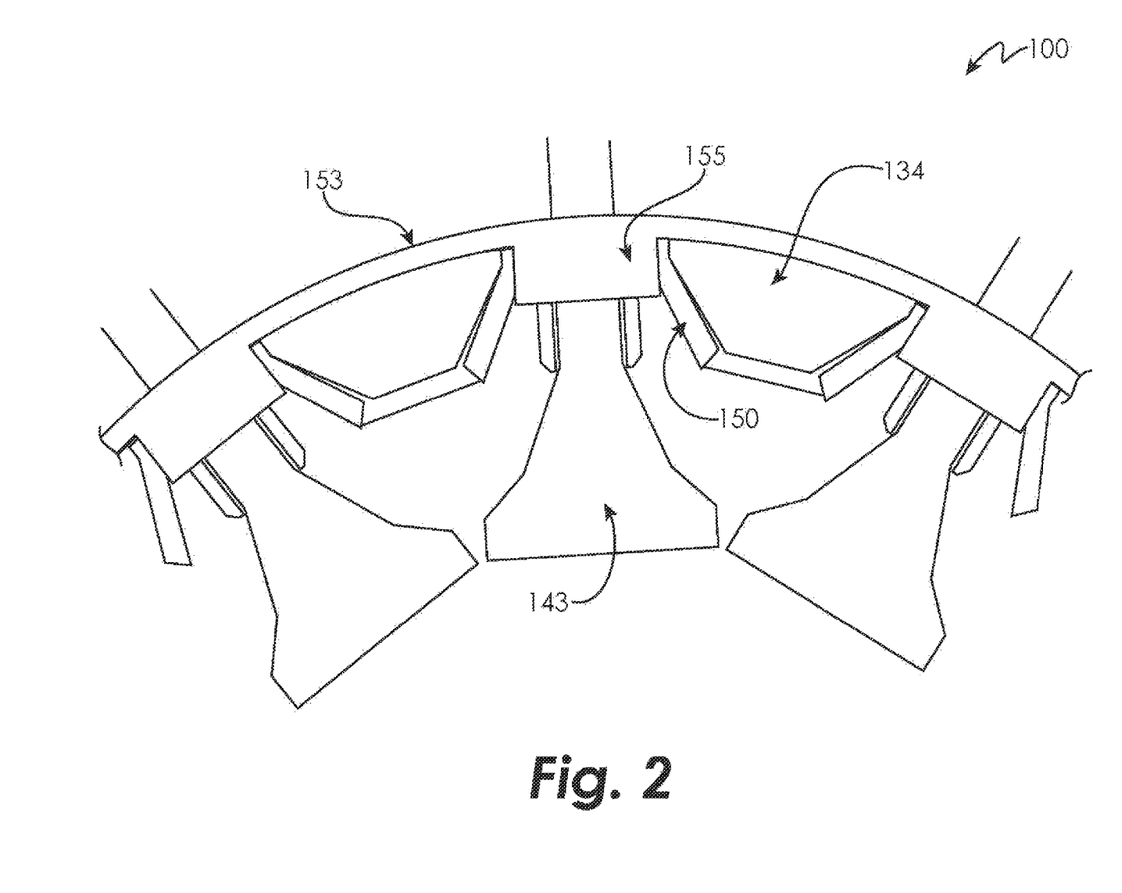
FIG. 2 is a forward view of a fan section in accordance with an embodiment.

In the embodiment show in FIG. 2, a fan section 100 includes a spinner seal 153. The spinner seal 153 may include one or more castellations 155 to correspond with the locations of the blade root 143. In some embodiments, the spinner seal 153 does not include catellations 155. It should be noted that FIG. 2 does not illustrate the fan hub. As will be appreciated by one of skill in the art, blade roots 143 are received in slots (not shown) formed in the fan hub. A spinner seal castellation 155 may seal against the blade root 143 and platform seals 150, disallowing leakage around the blade root 143. The castellation 155 may be contoured to fit the blade root 143 and platform seals 150. The platform seal 150 may be secured to the side or underside of the platform 134. The platform seal 150 may be constructed from an elastomeric material, such as a silicone rubber. Additionally or alternatively, the platform seal 150 may be covered by a protective fabric that also aids in bonding. As an example, an adhesive may be applied to the fabric to secure the platform seal 150 to the platform 134.

Figure 3:
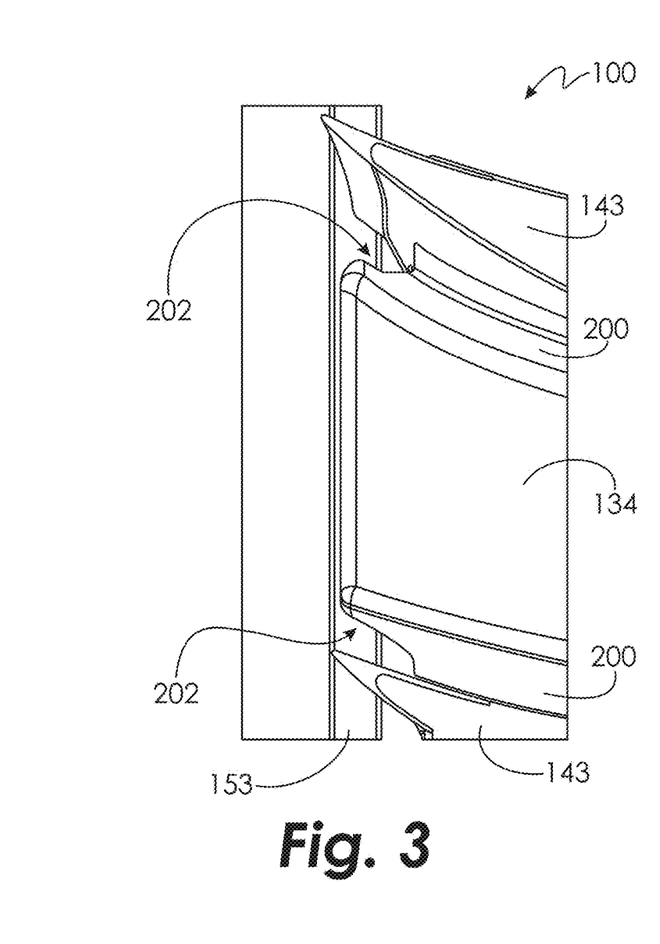
FIG. 3 is a top view of a platform and a fan blade.
Figure 4:
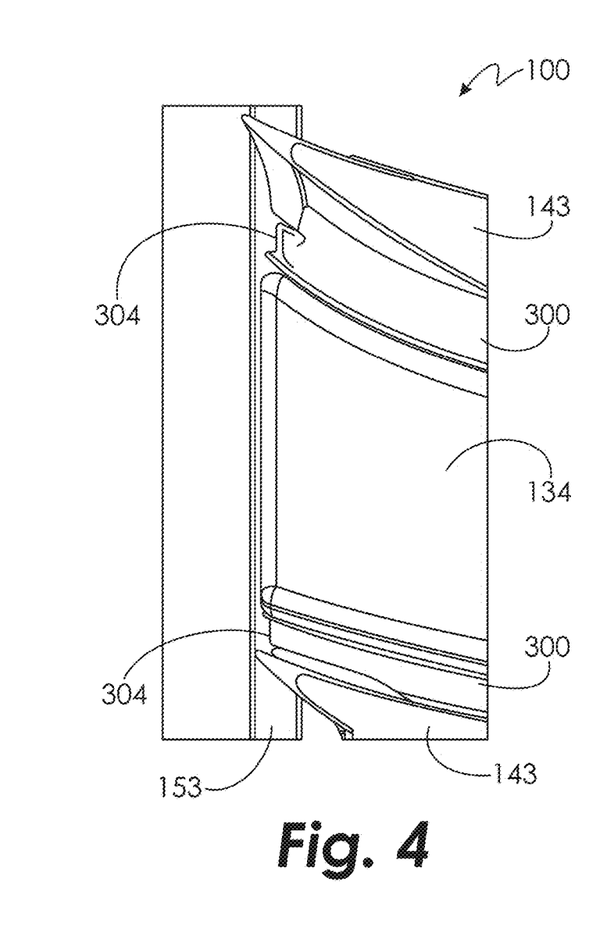
FIG. 4 is a top view of a platform and a fan blade in an embodiment.

FIG. 3 illustrates the fan section 100, wherein the platform 134 is positioned adjacent the spinner seal 153. A pair of blade roots 143 are positioned adjacent the platform 134 so that a blade root 143 is positioned on each side of the platform 134. A platform seal 200 is attached to each side of the platform 134 and extends toward the respective blade root 143. An open space 202 is formed between the blade root 143, the spinner seal 153 and the platform seal 200. The open space 202 may cause the platform seal 200 to pull away from the platform 134 when exposed to centrifugal loads. As illustrated in FIG. 4, a platform seal 300 is with a winglet 304 configured and arranged to close the open space 202.

Figure 5:
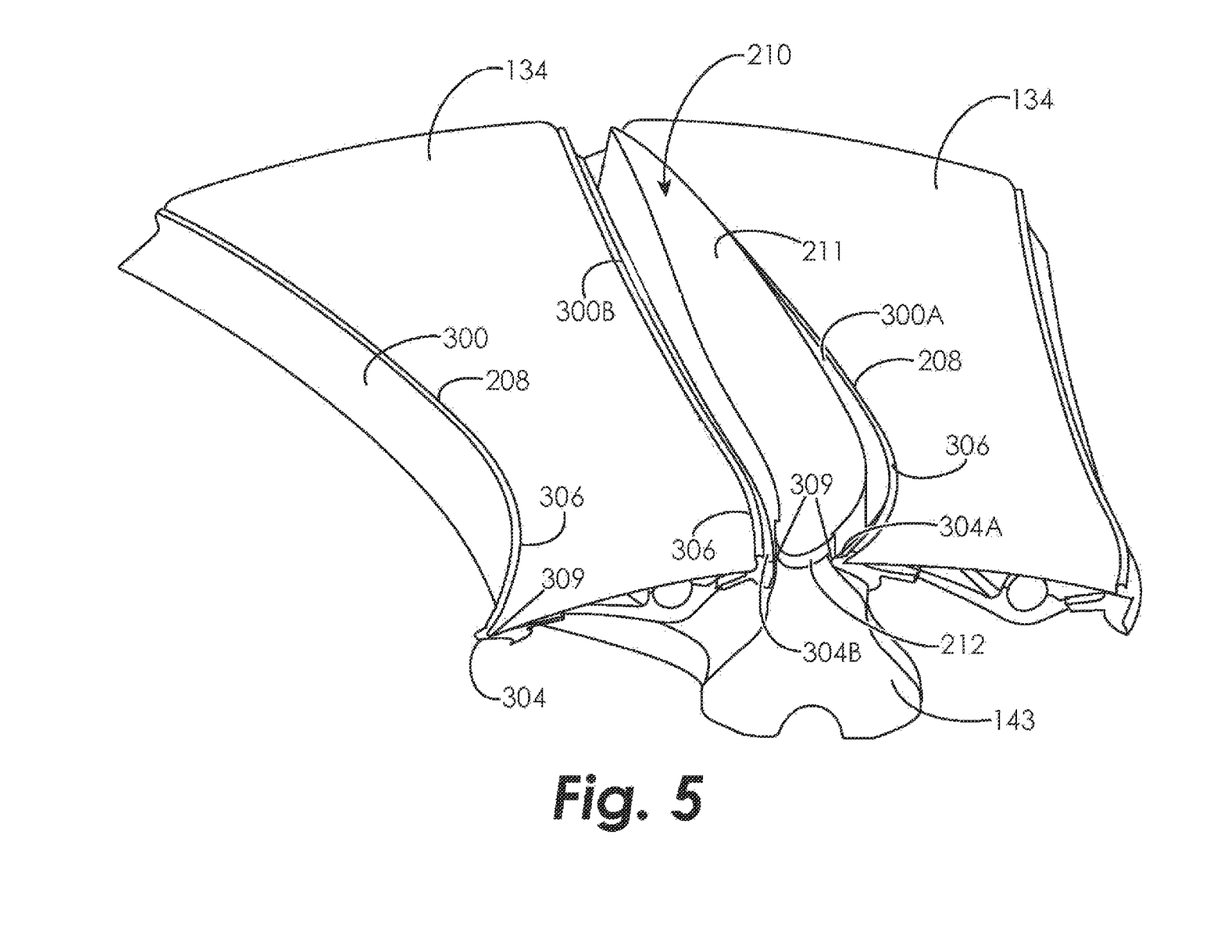
FIG. 5 is a top perspective view of a pair of platforms and a fan blade in an embodiment.
Figure 6:
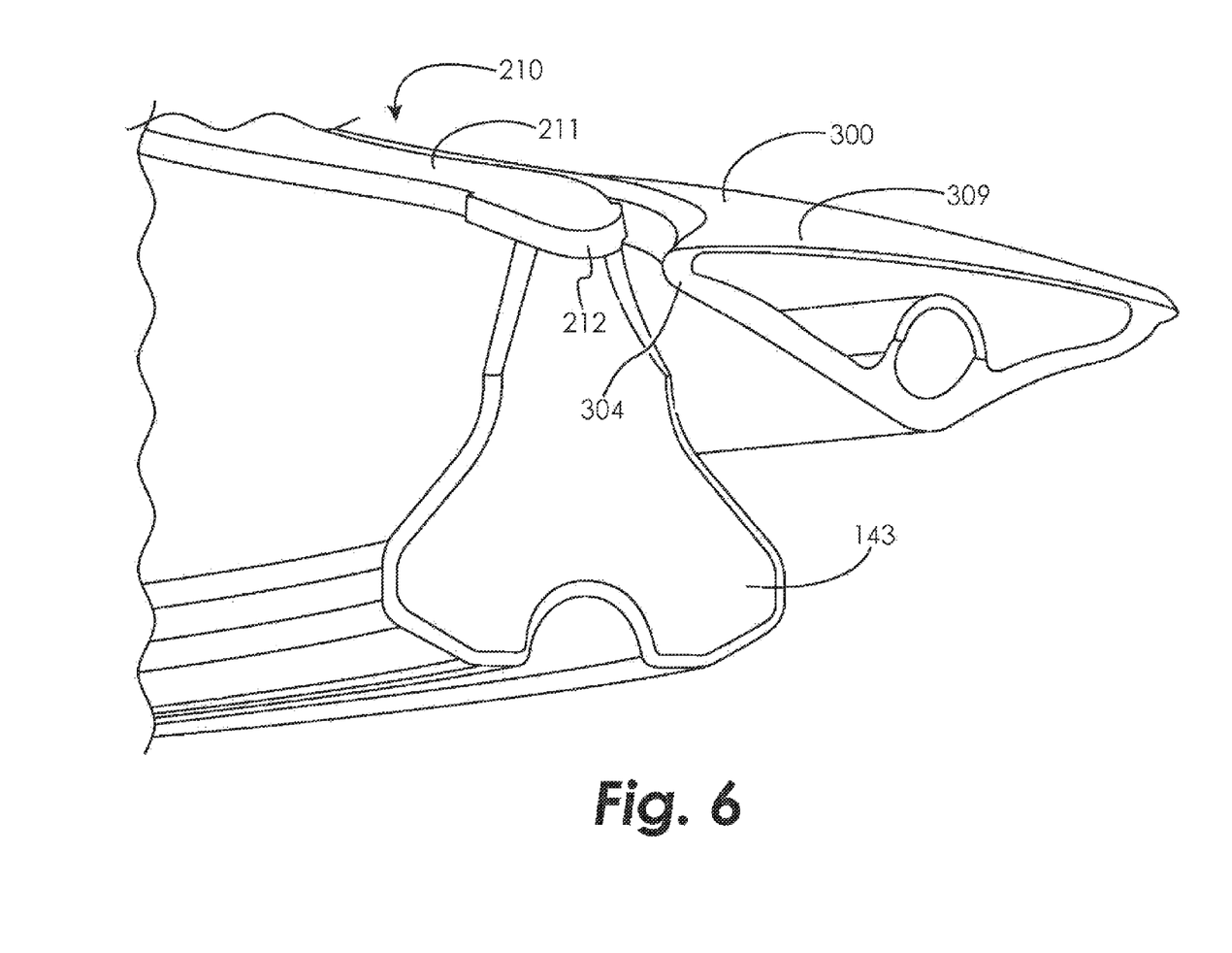
FIG. 6 is a side perspective view of a platform and a fan blade in an embodiment.

FIGS. 5 and 6 illustrate the winglet 304 in accordance with an embodiment. A fan blade 210 includes an airfoil 211 that extends from the root 143 to a tip (not shown). The airfoil 211 has a leading edge 212. The platform 134 is arranged adjacent to the fan blade 210. The platform seal 300 includes a base 306 secured to a side 208 of the platform 134. The winglet 304 extends from a leading edge 309 of the platform seal 300 and engages the leading edge 212 of the airfoil 211. In one embodiment, as shown in FIG. 4, the winglet 304 engages the spinner seal 153. In one embodiment, a first platform seal 300A has a first winglet 304A and a second platform seal 300B has a second winglet 304B. In one embodiment, the winglet 304A may contact the winglet 304B. In one embodiment, the winglet 304 is formed from a relatively stiff material to stiffen the platform seal 300 against deflections. In one embodiment, the platform seal 300 is constructed from an elastomeric material, for example, silicone rubber. In one embodiment, the winglet 304 is constructed from an elastomeric material, for example, silicone rubber.

Figure 7:
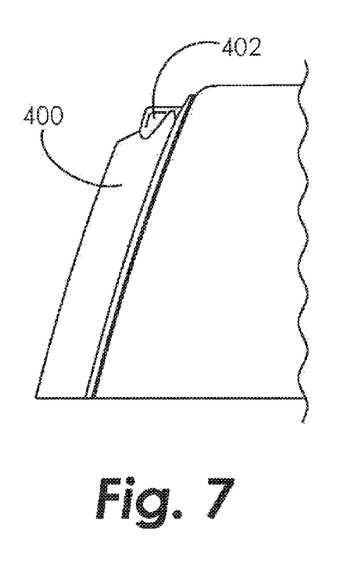
FIG. 7 is a top perspective view of a platform seal in an embodiment.
Figure 8:
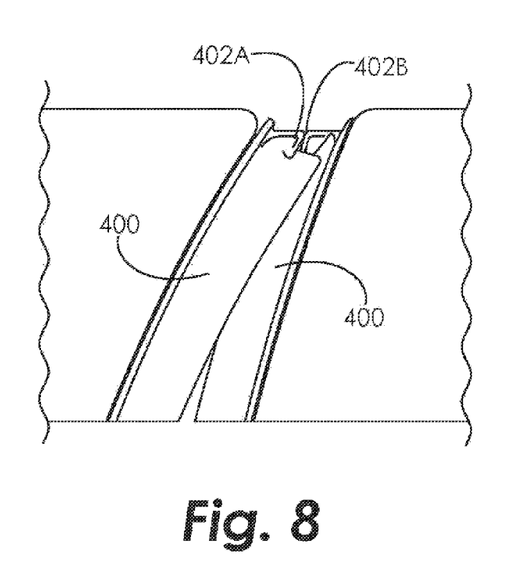
FIG. 8 is a top perspective view of a pair of platforms in an embodiment.

FIG. 7 and FIG. 8 illustrate and alternate embodiment of a winglet 402 extending from a platform seal 400. FIG. 8 illustrates a first winglet 402A contacting a second winglet 402B. FIG. 8 is illustrated without the fan blade 210.

The embodiments described herein include the winglet 304 or stiffener near the leading edge 212 of the blade 210 to eliminate the gap to the blade leading edge 212. The winglet 304 also stiffens the platform seal 300 against deflections due to centrifugal loads. Additionally, fabric (not shown) can be positioned over and supported by the winglet so as to cover the platform seal surfaces. In certain applications the winglet 304 can also be used to create contact between adjacent platform seals 300 around the blade leading edge 212.

The winglet 304 added at the leading edge 212 closes gaps in previous platform seal designs between the platform seal 300, blade leading edge 212, and spinner seal 153. In concert with the spinner seal 153, sealing at the blade leading edge 212 is improved. In some embodiments, the platform seal 300 may reduce the non-conformances, bonding issues, and premature wear issues that existing platform seals exhibit. The winglet 304 on the leading edge 212 acts as a ligament that prevents the platform seal 300 from lifting off the blade surface due to centrifugal loads. In certain applications the winglet 304 can also be used to create contact between adjacent platform seals 300 around the blade leading edge 212.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A fan section for a gas turbine engine comprising:
   a fan hub including a slot;
   a fan blade including an airfoil extending from a root to a tip, wherein the airfoil has an airfoil leading edge and the root is received in the slot;
   a first platform secured to the fan hub and arranged between adjacent fan blades;
   a first platform seal including a platform seal leading edge and a base secured to a side of the first platform;
   a first winglet extending from the platform seal leading edge and contacting the airfoil leading edge;
   a second platform and a second platform seal secured to the second platform, the second platform seal having a second winglet that contacts the first winglet at the airfoil leading edge; and
   a spinner including a castellated spinner seal, wherein the first winglet contacts the castellated spinner seal.

2. The fan section of claim 1, wherein the first winglet is constructed and arranged to stiffen the first platform seal against deflections.

3. The fan section of claim 1, wherein the first platform seal is constructed from an elastomeric material.

4. The fan section of claim 3, wherein the elastomeric material is a silicone rubber.

5. The fan section of claim 1, wherein the first winglet is constructed from an elastomeric material.

6. The fan section of claim 5, wherein the elastomeric material is a silicone rubber.

7. A gas turbine engine comprising:
   a fan section comprising:
   a fan hub having a slot;
   a fan blade including an airfoil extending from a root to a tip, wherein the airfoil has an airfoil leading edge and the root is received in the slot;
   a first platform secured to the fan hub and arranged between adjacent fan blades;
   a first platform seal including a platform seal leading edge and a base secured to a side of the first platform;
   a first winglet extending from the platform seal leading edge and contacting the airfoil leading edge; and
   a second platform and a second platform seal secured to the second platform, the second platform seal having a second winglet that contacts the first winglet at the airfoil leading edge; and
   a spinner including a castellated spinner seal, wherein the first winglet contacts the castellated spinner seal.

8. The gas turbine engine of claim 7, wherein the first winglet is constructed and arranged to stiffen the platform seal against deflections.

9. The gas turbine engine of claim 7, wherein the first platform seal is constructed from an elastomeric material.

10. The gas turbine engine of claim 9, wherein the elastomeric material is a silicone rubber.

11. The gas turbine engine of claim 7, wherein the first winglet is constructed from an elastomeric material.

12. The gas turbine engine of claim 11, wherein the elastomeric material is a silicone rubber.

* * * * *